(12) United States Patent
Eccleshall

(10) Patent No.: US 6,654,046 B2
(45) Date of Patent: Nov. 25, 2003

(54) METHOD AND APPARATUS FOR RECORDING A THREE DIMENSIONAL FIGURE ON A TWO DIMENSIONAL SURFACE ALLOWING CLOTHING PATTERNS TO BE PRODUCED

(76) Inventor: Julian A. Eccleshall, 1513 Charter Oak Ave., Bel Air, MD (US) 21014

( * ) Notice: Subject to any disclaimer, the term of this patent is extended or adjusted under 35 U.S.C. 154(b) by 485 days.

(21) Appl. No.: 09/774,095

(22) Filed: Jan. 31, 2001

(65) Prior Publication Data

US 2002/0012044 A1 Jan. 31, 2002

(51) Int. Cl.⁷ .................................................. H04N 7/18
(52) U.S. Cl. ...................................................... 348/61
(58) Field of Search ............................. 348/42, 61, 77, 348/129–130, 135–136; 700/131–132; 434/95, 99; 352/57, 86, 89; 345/425, 629–630; 702/155, 166–167

(56) References Cited

U.S. PATENT DOCUMENTS

| | | |
|---|---|---|
| 1,596,458 A | 8/1926 | Schiesari |
| 1,719,483 A | 7/1929 | Morioka |
| 2,066,996 A | 1/1937 | Morioka |
| 2,069,647 A | 2/1937 | de La Tour |
| 2,703,755 A | 3/1955 | Webb et al. |
| 2,973,688 A | 3/1961 | Bilibok |
| 3,089,244 A | 5/1963 | Levy nee Amselle |
| 3,383,770 A | 5/1968 | Xenakis |
| 3,883,955 A * | 5/1975 | Bush ............................. 33/12 |
| 3,988,520 A | 10/1976 | Riddle |
| 4,149,246 A * | 4/1979 | Goldman ..................... 700/132 |
| 4,238,147 A | 12/1980 | Stern |
| 4,286,852 A | 9/1981 | Stern et al. |
| 4,539,585 A | 9/1985 | Spackova et al. |
| 4,630,910 A | 12/1986 | Ross et al. |
| 4,885,844 A * | 12/1989 | Chun ............................. 33/15 |
| 4,949,286 A | 8/1990 | Ohba |
| 5,009,626 A | 4/1991 | Katz |
| 5,163,006 A | 11/1992 | Deziel |
| 5,163,007 A * | 11/1992 | Slilaty ........................ 700/132 |
| 5,341,305 A * | 8/1994 | Clarino et al. ............... 700/132 |
| 5,384,580 A | 1/1995 | Kadota |
| 5,485,235 A | 1/1996 | Meyers |
| 5,515,268 A | 5/1996 | Yoda |
| 5,615,318 A | 3/1997 | Matsuura |
| 5,636,030 A * | 6/1997 | Limbach ..................... 356/612 |
| 5,974,400 A | 10/1999 | Kagami et al. |
| 6,246,468 B1 * | 6/2001 | Dimsdale ..................... 356/4.02 |
| 6,415,199 B1 * | 7/2002 | Liebermann ................. 700/132 |
| 6,546,309 B1 * | 4/2003 | Gazzuolo ..................... 700/132 |

\* cited by examiner

*Primary Examiner*—Vu Le
(74) *Attorney, Agent, or Firm*—Hoffman, Wasson & Gitler

(57) ABSTRACT

A method and apparatus for providing a three dimensional representation of an object or an individual. Horizontal sections are taken of the object or the individual and are projected utilizing a number of optical subassemblies onto a horizontal screen. A digital camera is used to take a picture of each of the horizontal sections which then be transmitted to a computer including a display screen. The computer is provided with the appropriate software for producing a three dimensional representation on the display screen. This representation can be used to provide a properly sized pattern for the individual.

37 Claims, 8 Drawing Sheets

METHOD AND APPARATUS FOR RECORDING A THREE DIMENSIONAL FIGURE ON A TWO DIMENSIONAL SURFACE ALLOWING CLOTHING PATTERNS TO BE PRODUCED

CORRESPONDING APPLICATIONS

The present application claims the benefit of U.S. Provisional Patent Application Serial No. 60/179,207, filed Jan. 31, 2000.

FIELD OF THE INVENTION

The present invention is directed to a method and apparatus for producing a three dimensional recording allowing for interrogation, recording and replication of a three dimensional form at any scale. Original forms can also be generated without recording from an object, provided one can express the form mathematically or geometrically. The system and method can also be used for digital recording of the human body and, for example, applied to clothes making by using the recording of the human form to form fabric panels to fit that form. The process would also be useful in three dimensional ornamental detail work.

BACKGROUND OF THE INVENTION

The attempt to replace artistic sculpture and the manual reproduction of a person, animal or object by mechanical controlled replication was probably started by James Watt, the inventor of the practical steam engine. His experiments with a lathe-like device that employed a hinged lever continued until his death. Many sculptures and engineers, such as Cheverton and Donkin, created similar machines. Often the machines were similar to devices for producing drafting sketches, especially those, such as the Colas and Payne machines, for reproducing friezes. These mechanical methods can be reproduce and already-made bust, but have limitations since they cannot record and reproduce a posed living figure. Further, the pointing process which measures distances and sets a drill is slow and intricate.

The use of milling machines for figure reproduction required expensive computers and controls. The need to compensate for vibration and drill wear makes them extremely expensive and complex. Attempts to use sonar or lasers to measure an object, store the date in a computer and then control a drill or carving device, raise problems of synchronization of controls and other complexities. While progress has been made in doing such things, the devices or expensive, intricate and require expert machine operators. The cost of equipment makes such machines available to only a few. Using X-rays and computer tomography to get a section, for example, is too expensive to be widely available. The many cameras and complex software required for triangulation is also prohibitive for most applications.

A number of United States patents have issued directed to recording three dimensional images on a planar surface. These patents include U.S. Pat. Nos. 4,286,852 and 4,238,147 issued to Stern; U.S. Pat. No. 4,630,910 issued to Ross et al, and U.S. Pat. No. 5,485,325 issued to Myers.

The '147 Stern patent is directed to a system for recording images of a three dimensional surface by focusing on a plane of light irradiating the surface. A camera 14 is used in conjunction with a projector 12 which produces a plane of light. Therefore, the three dimensional information is recorded in the camera. Stern '852 describes an arrangement for recording three dimensional images of an object 10 placed upon a motion device 44. The camera 14 as well as the projector 12 are connected to a computer 54 including a CRT terminal 56 which coordinates the operations of the projector 12, camera 14 as well as the various motors used to rotate as well as to elevate and lower the object 10. As can be appreciated, this system, particularly as described in the Stern '852 patent can be very expensive.

The patent to Ross et al describes a method of measuring in three dimensions at high speed utilizing a projector 52 as well as a camera 51 directed toward an object 54 to be measured.

The patent to Meyers shows a pointing system for aiming an image recording apparatus towards a human subject. The aiming device includes a laser light divided into a plurality of discrete aiming beams. Neither of the Stern patents as well as the patents to Ross et al and Meyers suggests a system for economically producing a three dimensional image of an object on a two dimensional planar surface.

U.S. Pat. No. 3,383,770 issued to Xenakis is directed to a clothing measuring method and apparatus. This apparatus includes a projector 17 aimed at an individual 14 standing between a semi-transparent screen 10 and an electroluminescent panel 12. A film strip 18 is provided in front of the projector 17. The film strip comprises pairs of frames bearing an outline 19 or 20 representing the front and side outlines of a person of known size projecting each of the segments of the film strip against the individual will allow the individual to be properly sized. Additionally, U.S. Pat. No. 3,089,244 issued to Levy shows a device for photographically examining the outline and shape of an individual's body to provide the proper clothing fit. Both the Xenakis and Levy patents are not directed to a device for producing a clothing pattern.

U.S. Pat. No. 2,973,688 issued to Bilibok describes an adjustable pattern projecting machine. However, this machine does not produce an output which can be manipulated to create the proper clothing pattern for a particular individual. Additionally, none of the devices shown in the aforementioned patents would economically produce a representation of a three dimensional figure on a planar surface, such a cathode ray tube associated with a computer.

SUMMARY OF THE INVENTION

The disadvantages of the prior art are overcome by the present invention which provides an inexpensive and simple manner of creating an exact reproduction of a three dimensional image.

The problems of control and synchronization of the prior art are avoided by combining multiple perspectives at one time.

The present invention would allow shapes, which cannot be turned on a lathe, to be produced at a very low cost. The present invention would also avoid or minimize extensive data storage and processing with computers.

Additionally, the present invention can be utilized to provide clothing at a reasonable cost.

The objects of the present invention are accomplished by utilizing an imager housing assembly onto which various sections of a three dimensional object or person are projected. In one embodiment, a horizontal surface provided within the imager housing assembly is included onto which a desired section of the object or individual is projected. The object or the individual would be draped in a light absorbing covering material and a plurality of strips of light scattering material, such as white elastic, would gird the object or individual at various heights. One or more of a series of light sources would be provided between the imager housing assembly and the object or individual. The image housing assembly would contain a mechanism for raising and lowering the image housing assembly with respect to the object or the individual, as well as an optical system for receiving the light reflected from the object or individual. Therefore, at discrete heights, the image provided on the horizontal surface within the imager would be photographed by a digital camera attached to the image housing assembly. The camera is in communication with a computer provided with a display.

A second embodiment would employ a series of lasers to produce a plane of light for projecting various sections of the three dimensional object or individual at different heights along the object or the individual. This embodiment would not require the object or the invention to be draped in the light absorbing covering material, such as, but not limited to, black velvet and would negate the necessity of utilizing one or more light sources to illuminate the three dimensional object or the individual.

When used to create a clothing pattern, the computer would include software which would be able to manipulate the information gathered from the various perspectives utilized in either of the two embodiments to create a clothing pattern sized to a particular individual.

BRIEF DESCRIPTION OF THE DRAWINGS

The aforementioned and other aspects of the present invention are now described in more detail in the Detailed Description and accompanying drawings which follow.

DETAILED DESCRIPTION OF THE PREFERRED EMBODIMENTS

Figure 1:
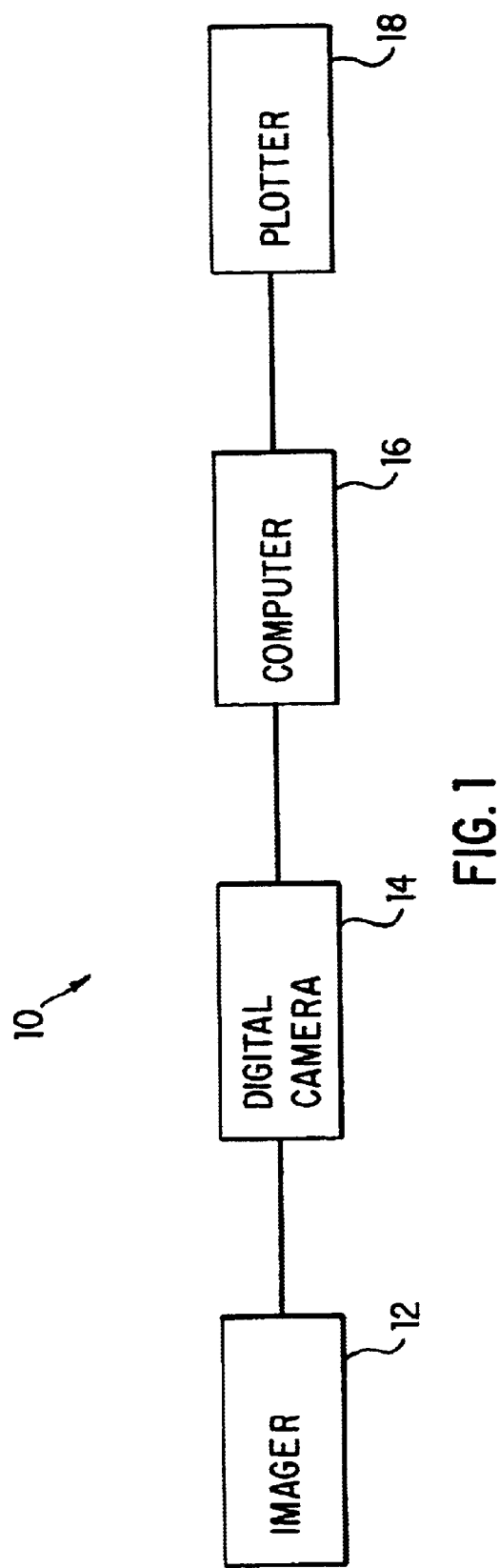
FIG. 1 is a block diagram showing the major components of the present invention.

The broad components of the present invention 10 are illustrated in FIG. 1. These components include an imager 12 including a flat horizontal screen onto which various horizontal sections provided in an imager housing assembly of a three dimensional object or individual would be projected at various heights on the object or the individual. A digital camera 14 would take photographs of each of these sections and would transmit the digital images of each of the horizontal sections to a computer 16 provided with the appropriate software. The software would allow an individual to manipulate a three dimensional representation of the object or the individual for various purposes, including creating a clothing pattern sized to the individual. Once this pattern is completed, a standard plotter 18 used to produce, for example, architectural drawings, would print the pattern which would then be used to sew a garment for the individual.

Although the present invention describes a system in which the various horizontal sections are projected onto a flat horizontal screen, this does not have to be the case. What is important is that the various horizontal sections be projected onto a planar surface. Based upon the optical system which will be used, the flat screen could be provided at any angle from the horizontal to the vertical.

For the purpose of describing the various embodiments of the present invention, the object to image is taken to be a statue or a person standing vertically, although any object could be imaged in any orientation. To make a complete three dimensional image, one would increase the points of view. Several embodiments of the present invention could be used with appropriate synchronization and orientation.

The image to be created is produced from a set of contiguous, or nearly contiguous, images of horizontal sections. In order to image a section, a narrow, horizontal region of the object is illuminated using a plane, a collimated source or sources of light such as a laser, or by attaching a narrow light-emitting strip or, a contrasting light strip to dark clothing worn by the individual to obtain the appropriate horizontal regions when utilized with a series of light sources, such as fluorescent bulbs.

The scattered light from each of the illuminated sections is imaged onto a flat, horizontal screen provided in the imager 12. The screen is placed at approximately the same height as the illuminated section. The image on the screen is derived from several independent optical systems which reflect the light rays scattered from the object or individual through a right angle while focusing and reverting them onto the image plane of the screen. The optical systems can be placed above or below the illuminated region and the screen. They are designed so that distortions of the individual images from the independent systems are minimized, primarily by insuring that the magnification of all parts of the image are close to unity. The number and locations of the individual optical subsystems or optical assemblies are such as to view adequately all or a portion of the object while ensuring that the separate images accurately merge to form a single composite image on the horizontal screen.

Figure 2:
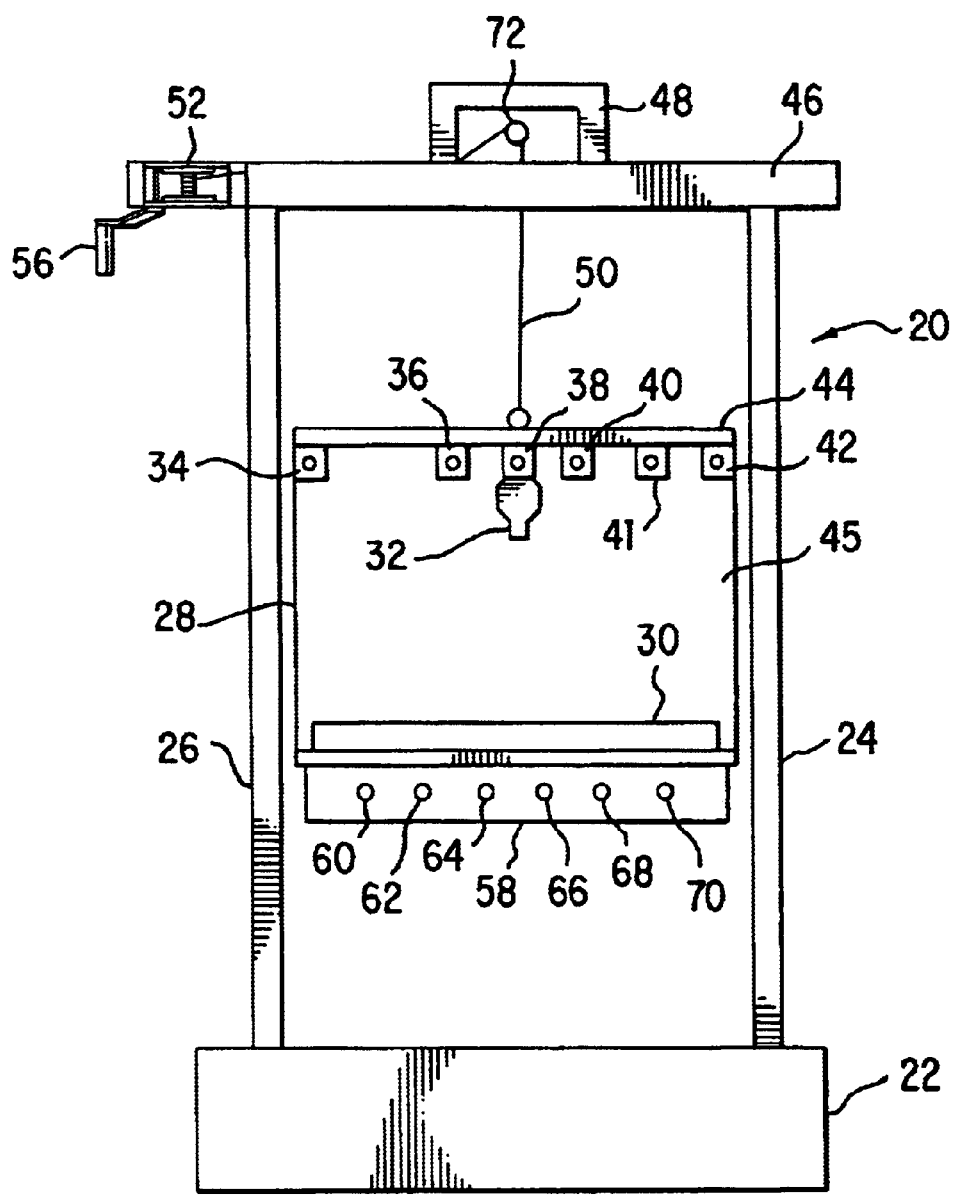
FIG. 2 is a front view of a first embodiment of the present invention.

One embodiment of the imager of the present invention 20 is shown in FIG. 2. The imager is placed on a relatively planar base 22 to which two vertical frame components 24 and 26 are connected. These vertical frame components are attached to a top frame component 46. The imager 20 includes an imager housing assembly which is raised and lowered with respect to the object or individual. The object or individual is fixed in space, as is the frame of the imager and the base 22. To ensure repeatable vertical motion of the housing, its motion may be guided on the base 22 by a cord 50 and pulley arrangement 72, the cord 50 being attached to a top section 44 of the moveable image housing assembly 45 of the imager. The housing assembly is held steady by cross bars and stabilized against the frame. For description purposes, it is noted that a front planar section adjacent to the moveable imager section 45 at 28 has been eliminated. The string, cord and other filament device is attached to a spool 52 containing a hand crank 56 through a top housing position 48. Rotation of a hand crank 56 in either the clockwise or counterclockwise motion would be used to raise or lower the moveable imager housing assembly 45. It is noted that other mechanical or mechanized arrangements for raising and lowering the moveable imager section can be employed. Additionally, it is noted that the system shown in FIG. 2 utilizing the hand crank 56 would be used to move the imager housing assembly 45 to discrete heights with respect to the object or individual to be visualized. It can be appreciated that a totally automatic system can be employed in which these various heights are programmed into the computer 16 which would then raise or lower the vertically moveable imager housing assembly 45 to the appropriate heights.

One manner of appropriately illuminating the various horizontal sections would be to utilize a series of lasers to produce a collimated plane of light. These series of lasers are denoted as 60, 62, 64, 66, 68 and 70 associated with an optical system 58 attached to the bottom of the moveable imager housing assembly 45. Therefore, when the moveable imager housing assembly 45 would be raised or lowered, this laser system would also be raised or lowered incrementally or continuously.

The optical laser system 58 can be removably attached to the bottom of the moveable imager 45. The top portion of the moveable imager 45 is provided with imager optical elements 34, 36, 38, 40, 41 and 42. Although the exact number of these imager optical elements is not important, when utilized with the laser light sources, the number of imager optical elements should equal the number of lasers. The light produced from the laser elements to produce a plane section of light is directed to the object or individual to be imaged, is scattered therefrom and passes through the imager optical element 34, 36, 38, 40, 41 and 42. Each of these imager optical elements serves to provide a portion of the image that can be merged with images from the adjacent element to form a whole image that is relatively distortion free. This image is provided on a horizontal screen 30 provided within the imager housing assembly 45. This is achieved by the choice of the individual optical elements and their location in line such that an illuminated point on the object or individual and its corresponding image are equidistant from the optical element.

The imager optical elements 34, 36, 38, 40, 41 and 42 produce an image such that it appears on the screen 30 as would the virtual image from an extended plane mirror placed midway between the object and the image. The image is recorded, for example, by the utilization of a digital camera 32 located as shown in the imager housing. A web cam or other type of digital camera can be employed. The optics of a web cam are often fish eyed due to relatively inexpensive optics. However, accurate optics can be created using the basic optic formulas. The images of each of the horizontal sections of the object or the individual are then recorded by the digital camera 32 as the height of the imager housing 45 and the laser plane of light optical system 58 is moved in increments. The distance between the increments determines the resolution of the image, the highest resolution being achieved when a distance between the increment is approximately the height of the illuminated region on the object less the optical path. The images taken by the digital camera 32 are sent to the computer 16 for display and manipulation.

Figure 3:
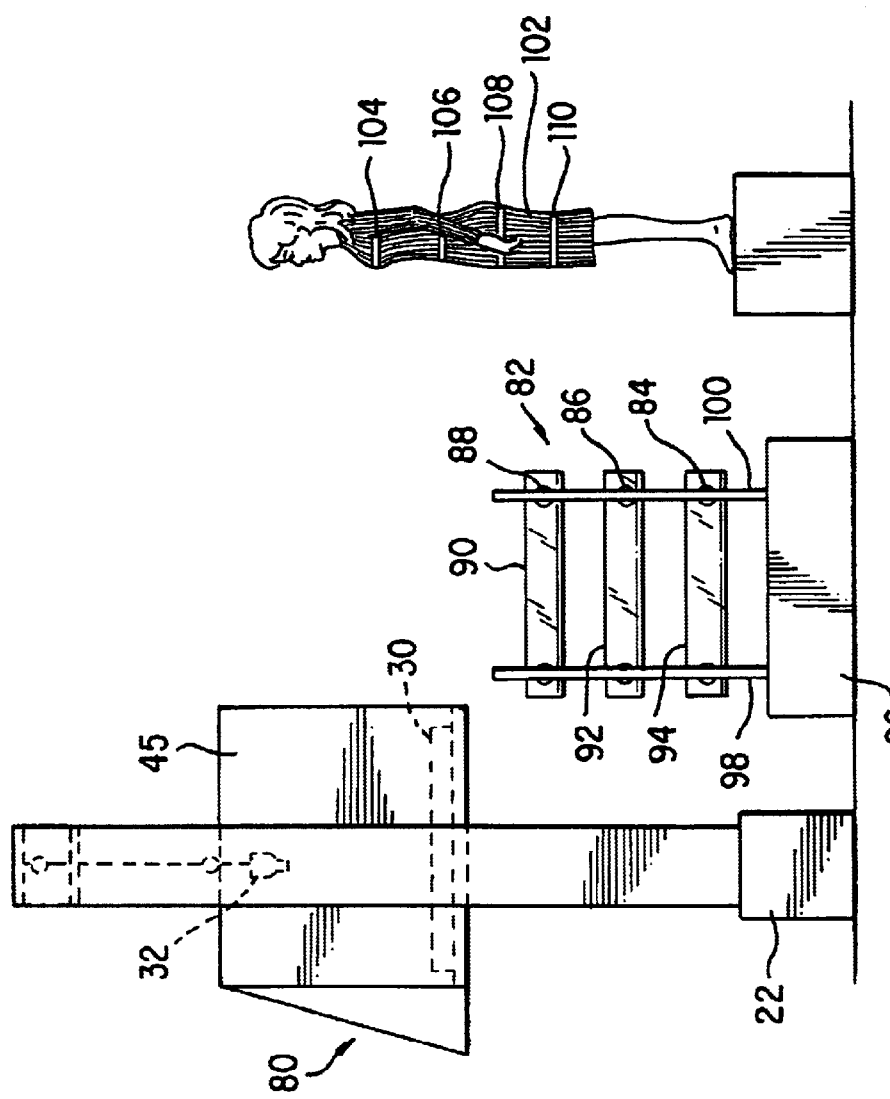
FIG. 3 is a side view of a second embodiment of the present invention.
Figure 4:
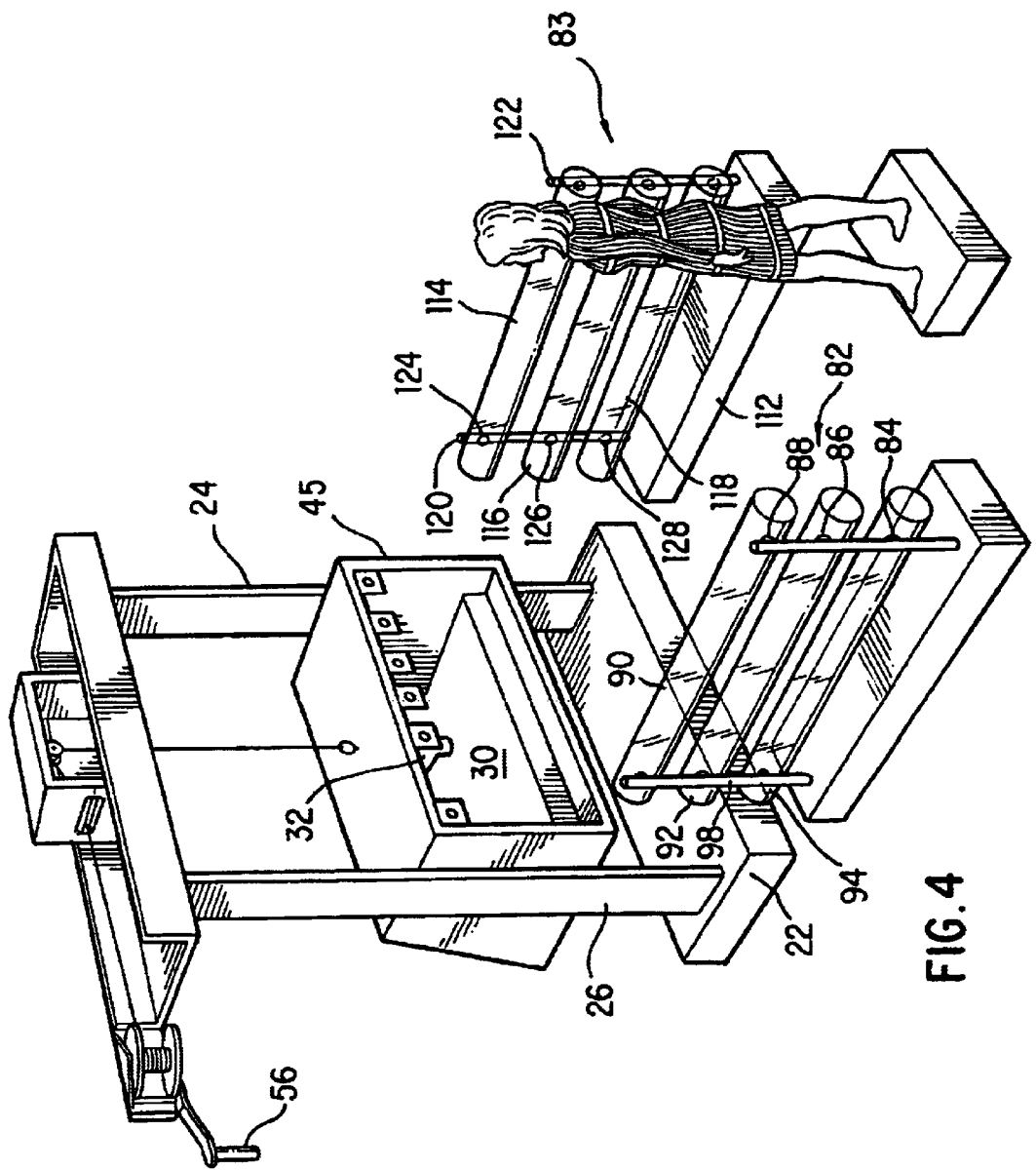
FIG. 4 is a perspective view of the second embodiment of the present invention.

FIGS. 3 and 4 illustrate a side view and perspective view of a second embodiment of the present invention showing an individual standing on a base in front of the imager. While FIG. 2 employs a series of lasers to create a plane of light reflected off the individual to be imaged upon the horizontal screen 30, FIGS. 3 and 4 show a plurality of longitudinal light sources 82, 83 provided on either side of the individual between the individual and the imager. Light source 82 contains three fluorescent bulbs 90, 92 and 94 each supported by support elements 88, 86, 84 respectively. These support elements are provided on vertical posts 98 and 100 which are supported by a base 96. Similarly, light source 83 includes a base 112 supporting vertical supports 120, 122. Each of these supports includes individuals support means 124, 126 and 128 for fluorescent light sources 114, 116 and 118. The individual is adorned in dark clothing 102 provided with a plurality of white ribbon-like strings 104, 106, 108 and 110 so that these horizontal sections are individually projected upon the horizontal screen 30 after they pass through the imager optical elements 34, 36, 38, 40, 41 and 42. Alternatively, these ribbon-like strings could be provided on a garment worn by the individual. Once each of these horizontal sections is properly projected onto the horizontal screen 30, the digital camera 32 would take the appropriate pictures which would then be merged to form a three dimensional projection on the computer's display screen. It is noted that the operator of the system could utilize the display screen to properly position the moveable imager 45 to take the appropriate picture.

Figure 5:
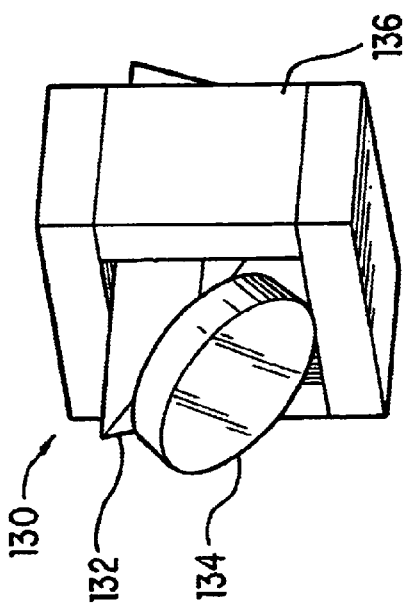
FIG. 5 is a perspective view showing one of the optical subsystems used in the second embodiment of the present invention.

One type of imaging optical elements 34, 36, 38, 40, 41 and 42 are shown in FIG. 5. Each of these elements 130 comprises an Amici roof prism 132 and a thin focusing lens 134 butted to it and provided within a housing 136. Light from the plane illuminated region of the object or individual is thereby deflected through 90 degrees. The object and image distances from a lens, u and v respectfully, (see FIG. 8) are chosen to be equal and approximately twice the focal length of the lens. In the case of a subassembly with one lens, the exact equality of the optical distances can be maintained by compensating for the distance the light travels in the prism by offsetting the height of the screen 30 so that it becomes slightly above the height of the illuminated region on the object. Although many types of lenses and prisms can be employed, the embodiment illustrated in FIG. 5 employs 25 mm. diameter double convex lenses with a focal length of 400 mm. Each lens 134 is abutted to the roof prism 132 at approximately 45 degrees or the entrant face surface. The entrant surfaces of the roof prisms are approximately the size of the lenses, though the lenses were irised to increase depth of field.

Instead of the Amici roof prisms, the imager optical elements can be produced by utilizing surface mirrors glued to opposed Porro prisms or other 45 degree surfaces to create a roof mirror. This embodiment will use large lenses to gather light, projected in a plane and scattered from the object to be recorded. The size of relatively inexpensive lenses and surface mirrors allows one to construct the camera of sufficient size to interrogate large regions. Controlling the orientation of the roof mirrors can be done with a centrally mounted carriage bolt threaded through a ball or bead. The bolt allows one to tighten the roof mirror to a plank holding them and control the orientation of the roof mirrors about the ball or bead with friction. This allows the control of the image path and is an economical method of synchronizing the optical path of an object's scattered light through several optical subsystems.

A second type of camera system would combine several multiple aperture camera images if one marked the form to be imaged such that a computer or other medium could combine the several images. This embodiment has two optical systems. Six would be ideal to gather all sides. The object to be imaged is drawn through a central plane of light from which several multiple aperture cameras record data from the surface of the object.

Figure 6:
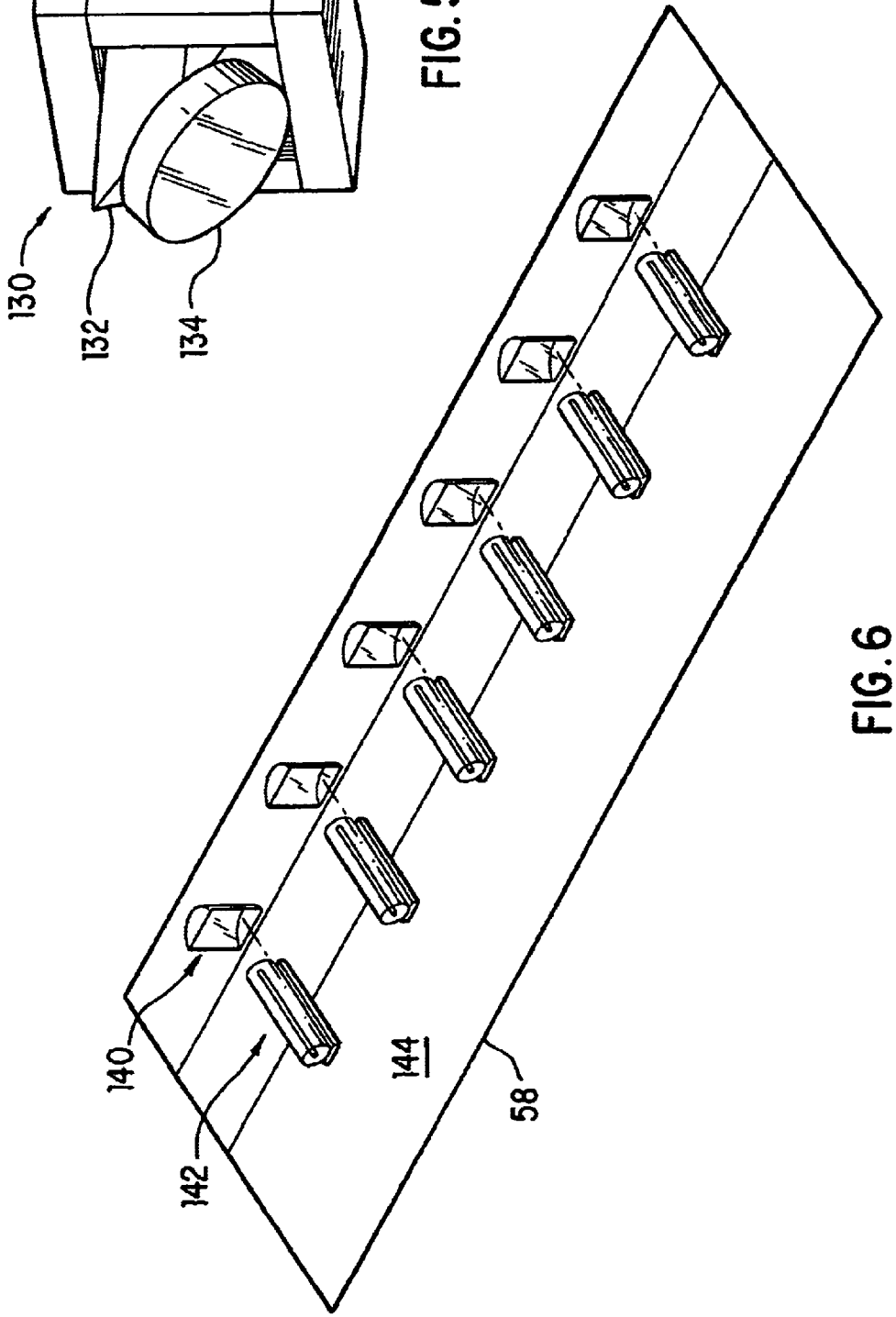
FIG. 6 is a perspective view of a series of lasers used in the second embodiment of the present invention.

As previously indicated with respect to FIG. 2, a series of lasers 58 can be employed to produce a sharp, well defined slit of constant vertical "height". This series of lasers is shown with respect to FIG. 6. A number of small lasers 142 are secured on a flat plate or plank 144 in a line. They are mounted such that they can be aimed in the same plane and the orientation can be controlled by mounting them on a pivoting base. Cylinder lenses 140 are provided for each of the lasers 142. These lenses (or optically adequate glass tubes) are mounted in front of the lasers such that their orientation can also be controlled. This will create the plane of light. A further alternative is to mount the cylinder lens against a first surface mirror. In this manner, the lasers can be pointed at approximately a right angle to the cylinder lens and surface mirror and be aimed as desired. Surface mirrors, also controlled in their orientation, can redirect scattered planar light back on the object to be imaged.

Since lasers can harm an individual's eyes, it is preferred that the embodiment illustrated in FIGS. 3 and 4 be employed to produce patterns for garments. If the light source as shown in FIGS. 3 and 4 are employed, as indicated hereinabove, scattering light from a marked imaging garment is the most useful method to fit a pattern to a body. This system would also minimize and simplify data entry. A light scattering garment as shown in FIGS. 3 and 4 with light absorbing markers or a light absorbing garment with light scattering markers could be used.

Figure 7:
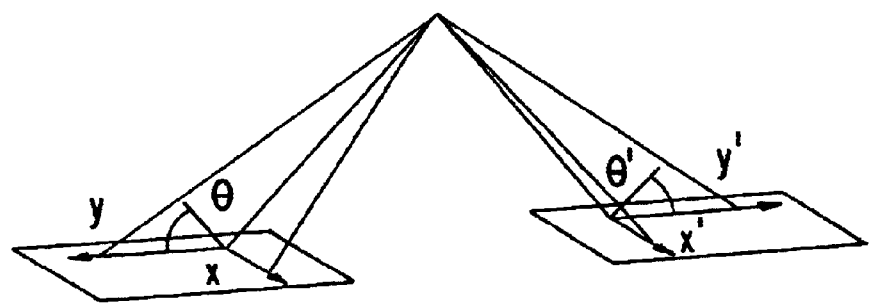
FIG. 7 shows optical ray paths used in the present invention.

As previously indicated, it is important to position the object or individual at a precise distance with respect to the various optical subassemblies and the horizontal screen 30. Each of the subassemblies includes a lens or lenses as well as an Amici prism or mirror-based equivalent. For an individual subassembly, the object and image planes, together with the optical ray paths are depicted in FIG. 7. Several assemblies located in line, or on an arch, extend the region of the object that is imaged.

The focusing lens inverts the image, but the mirror system reverts (rather than inverts) it laterally. The combination provides an image that is oriented as shown. The distances from the lens to an object point and from the lens to the corresponding image point, as shown in FIG. 7, are equal. Also, the object and image planes are set at equal angles to the respective means rays (i.e., $\theta=\theta'$, say). It can be shown that the image is, to first order, undistorted. It is therefore equivalent to the virtual image that would be seen if a plane mirror were placed normally and mid-way between the object and image planes. To prove this it is sufficient to show that, in the rectangular coordinate frames shown in the figure:

$x'=x$ and $y'=y$.

Figure 8:
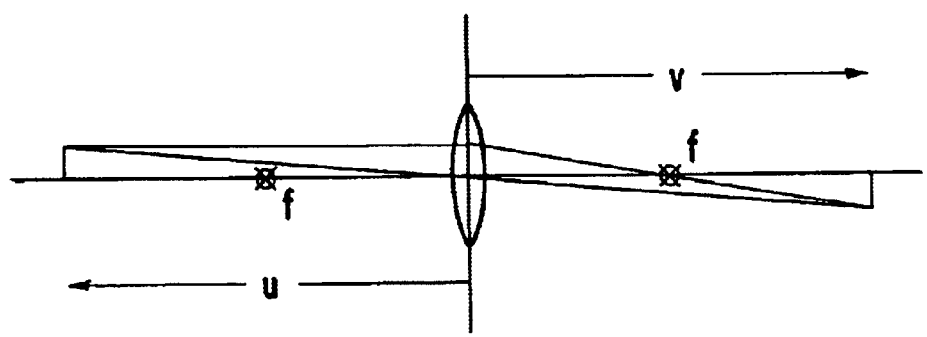
FIG. 8 shows the placement of an object and an image using the teachings of the present invention.

To justify this statement, consider a simple focusing lens with focal length f. For an object placed at $u=2f$, an image will be observed at a distance v from the lens and $v=2f$, as shown in FIG. 8 (distances measured from the lens are taken to be positive).

Lateral Magnification $$m_p = -v/u = -1 (v=u=2f)$$

The axial or longitudinal magnification $m_a$ can be obtained from the standard lens-maker's formula:

$$\frac{1}{u} + \frac{1}{v} = \frac{1}{f}$$

Differentiating $$-\frac{dv}{v^2} - \frac{du}{u^2} = 0$$

And $$m_a = \frac{dv}{du} = -\left(\frac{v}{u}\right)^2 = -1$$

Now, due to lateral reversions, $$\frac{x'}{x} = -m_p = 1$$

And if $\theta=\theta'=0$, including axial inversion due to the mirrors or Amici prism $$\frac{y'}{y} = -m_p = 1$$

More generally, if for all $\theta=\theta'$ (including $\theta=45°$) then to the extent that the depth-of-field is adequate, we have $$\frac{y'}{y} = -m_p \frac{\cos\theta}{\cos\theta'} = 1$$

This is reinforced by two facts:

$$\frac{y'}{y} = -m_a \frac{\sin\theta}{\sin\theta'} = 1$$

and that, at all corresponding image and object view points, $v=u$

Hence we can write (as has been verified by experiment to a good approximation):

$y'=y$

And $x'=x$

Except for the case when $\theta=\theta'=0$, the distortion-free image requires that $v=u$ (i.e., unit magnifications in x and y). For the case when $\theta=\theta'=0$, only $m_p$ is involved and the image can be scaled optically by putting $v \neq u$. The reverting property of the optical assemblies is essential to being able to have multiple assemblies extend the region of the object that can be imaged without distortion. In order to obtain the highest edge resolution on the image, the dimensions of the plane object and image must be smaller than the depth-of-field of the lens system. However, the region of unit magnification, and therefore low distortion is enhanced by the fact that every point on the object is at a distance to the lens that is equal to the distance from the corresponding image point to the lens.

For the purpose of describing embodiments of the invention, the object to be imaged is taken to be a statue or a person standing vertically, although any object could be imaged in any orientation. To make a complete three-dimensional image one would wish to increase the points of view. Several embodiments of the machine could be used with appropriate synchronization and orientation.

The image is to be built up from a set of contiguous, or nearly contiguous, images of horizontal sections. In order to image a section, a narrow horizontal region of the object is illuminated using a plane collimated source (or sources) of light or by attaching a narrow light-emitting strip (which could comprise discontinuous emitters or filaments to the object so that it conforms accurately to its surface.

The scattered light from the illuminated section is imaged on a flat horizontal screen adjacent to the object. The screen is placed at approximately the same height as the illuminated section (less the optical assemblies light path in the case of a single lens sub-assembly). The image on the screen is derived from several independent optical systems which reflect the light rays scattered from the object through a right angle, while focusing and reverting them onto the image plane. The optical systems are placed above (or below) the illuminated region and screen. They are designed so that distortions of the individual images from the independent systems are minimized, primarily by ensuring that the for all parts of the image are close to unity. The number and locations of the individual optical sub-systems (or optical assemblies) are such as to view adequately as large an aspect of the object while ensuring that the separate images accurately merge to form a single composite image on the screen.

Several embodiments of the individual optical systems are possible and have been investigated. Straight through Porro prism-lens-Porro prisms, similar to systems used in binoculars suggest themselves, yet the geometry is cumbersome. A 45 degree erecting prism, as used in telescopes would also have difficult geometry.

A compact embodiment consistent with the present invention, comprises a single focusing lens and Amici prism (or roof mirrors set as such) to be described in more detail below. Alternatively two lenses could be used, on on each side of the Amici prism—an arrangement that is more symmetric and allows adjustments to the focal length of the focusing sub-system. Another embodiment involves a lens and a pair of Porro prisms used in conjunction with penta-mirrors, that is mirrors that emulate the action of a Penta-prism. Other embodiments comprise a lens, a Dove prism and a plane mirror, Pechan assemblies or portions of an enormous lens, all with the appropriate geometry.

In all cases the lens (or lenses) is (or are) preferably to be located as near the center of the system as possible and, typically, the lens or lens pair should have a focal length of one half the distance from the assembly to both the object and image. Relatively small lens apertures (less than a few percent of the image and object distances) are required to provide the depth of field at the image in order to ensure that the overall composite image is relatively free from distortion.

The image on the screen, which depicts the surface of the object at a particular height, can be recorded with a digital camera. The digital camera serves to transfer the section image to a small computer, such as a PC. Standard software, such as Paint, Paint Shop Pro, Autocad, etc. can then be used to transcribe the image so as to yield the coordinates of the section's surface in the computer memory.

The prior art system of making a dress, or other garments, relies on inserting several darts on a few panels of fabric and careful sizing. The present invention improves upon this system by creating a pattern sized to the individual and printing out this pattern and then subsequently creating the garment.

Figure 9:
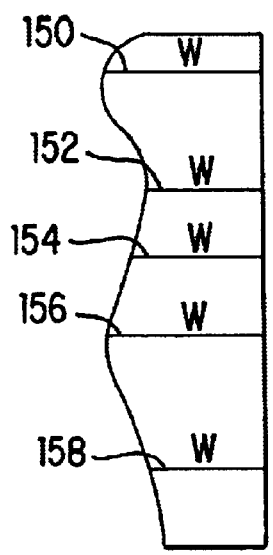
FIG. 9 is a depiction of various sections of a three dimensional object or an individual.

Due to the bilateral symmetry of the human body, one could image the left or right half section of the body, spine to midbelly and recreate the other half in a computer when needed. In this example, several heights of a dress are recorded such as the hem, buttocks, hips, waist, bust, etc. as shown in FIG. 9 by section lines 150, 152, 154, 156, and 158. One could extend the section heights to a plane through the breast bone and spine.

Having retained the z height for each section we can assign (x, y, z) points of equal distance along each section edge and also record the curve distance for each height. Having assigned 10 points, say, in a scaled three dimensional Cartesian system on each half section of the body, one can measure the distances between points on the same section and same numbered and adjacent numbered points on the sections above and below. The Pythagorean theorem for three dimensional Cartesian coordinates will provide this information.

With a table of named distances between named points set on the surface of a three dimensional form one can begin to create a pattern. These distances are: the curve distance and distances between points on the same section, and straight lines between points that are adjacent, only some of which will be used.

To organize a pattern one can arrange on the section heights a system of approximate triangles, with splined, or curved fitted edges, alternating in their base. Triangles are a starting point since, in only measuring distances between points in a three dimensional grid, a three sided figure of set lengths can only have one shape when recreated.

One can use equations for circles to solve for x and y and create the triangles. The equations are:

$$x^2+y^2=r^2$$

and $$(x-L)^2+y^2=r^2$$

These will derive the following formulas for x and y.

$$x=(r^2+L^2-R^2)2L$$

$$y=+ \text{ or } -\text{square root of } (r^2-x^2)$$

Figure 10:
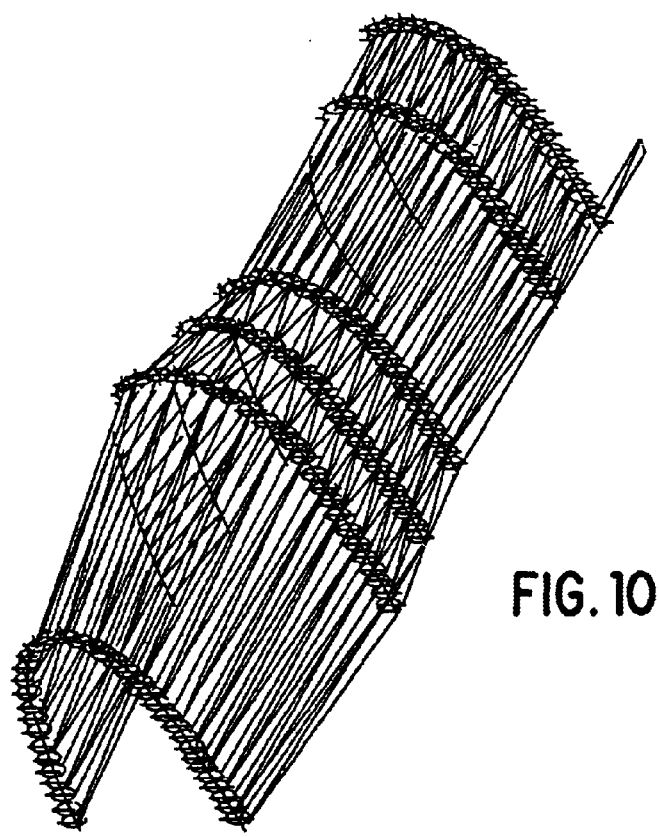
FIG. 10 shows a two dimensional representation of various sections utilizing the teachings of the present invention.

One can further increase accuracy by splining or curve fitting the series of straight lines into a curve and by flattening and stretching the form in the x and y plane according to the ratio of the distance along a curve and the distance between endpoints of a curve or the length of an angled line and one of the axis lengths. As with the earlier math, most software packages, such as Autocad, have commands for scaling or stretching or otherwise modifying forms and one need not solve the equations explicitly. A surface geometry of this measurement is shown in FIG. 10 provided with a number of poly lines, with each poly line corresponding to one of the sections 150, 152, 154, 156 and 158 shown in FIG. 9.

To create a garment officially, one must organize the pattern for the easy joining of panels. Ideally, in the creation of a garment, there will be two operations to be formed, namely the vertical and horizontal sewing passes of deletion from one large fabric panel. Additionally, a lining could also be glued to the fabric.

Figure 11:
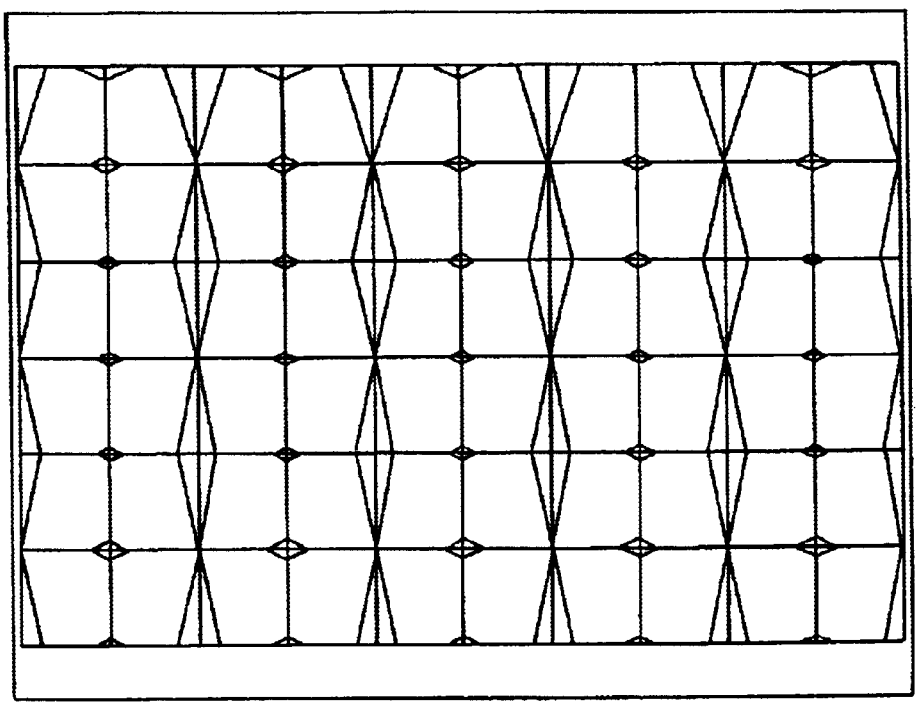
FIG. 11 illustrates a final pattern produced utilizing the teachings of the present invention.

In this way, one could control many small pieces of fabric without having to handle them individually, but only in simple linear sewing and cutting operations. We can delete the excess fabric in both the vertical and horizontal dimension in the manner shown in FIG. 11.

With respect to patterns, the number of panels in shapes could be developed beyond the very simple introductory examples are triangles used here to outline this system. Many more section heights could be imaged. With many clothes sections it would help to mark the desired section heights with imaging. Additionally, one should also minimize data entry due to computer language communication problems. One should keep the data under control so that one could transfer it to other programs easily with a minimum of processing time.

If one desires to be extremely accurate in recording three dimensional data, one will have to deal with edge selection and the interrogation of cavities. This is because the plane of light will have to have some thickness and when it recombines on a flat screen, there will be some blurring and spreading of light. Also, in incorporating several perspectives, the blurring could be different for each perspective. Therefore, one should be aware of which "edge" of the plane of light is the true one for the screen height and which edge, the upper or lower, would be preferred. The possibility of edge inversion in dealing with some protuberances must be addressed. One of these would be when there are many protuberances on an object which are closer together than the thickness of the light beam as it is projected on the image plane. This would be the case with human hair and many other small details. The light beam dimension will essentially limit the detail that can be acquired.

Another cause of blurring would be when the spread of light away from an edge of one assembly interferes with the true section edge, which was relayed by another assembly. This would be a very slight difference, but could be important if one imager was on a greater radius from the axis than another which was viewing the same region of an illuminated object, or the equivalent for a linear system.

Finally, to increase the points of view, one can rotate the object to be interrogated in synchronization with the rotation of the camera recording a section. This will make the point of view of each assembly a line and increase the points of view.

The present invention has been described in language more or less specific as to structural and methodical features. It is to be understood, however, that the invention is not limited to the specific features shown and described, since the means herein disclose, comprise preferred forms of putting the invention into effect. The invention is, therefore, claimed in any of the forms or modifications within the proper scope of the appended claims, appropriately interpreted in accordance with the doctrine of equivalence.

What is claimed is:

1. A system for obtaining a rendering of a three dimensional figure comprising:
    an imager housing assembly provided with an enclosed vertically moveable section including a bottom planar horizontal surface;
    a horizontal planar screen provided on said bottom planar horizontal surface;
    a first optical system attached to the exterior of said enclosed vertically moveable section, said optical system receiving light reflected from the figure and further directing the light onto said horizontal planar screen;
    a digital camera provided within said enclosed vertically moveable section directed at said horizontal planar screen, for creating a plurality of images of the information provided on said horizontal planar screen;
    a device for raising and lowering said vertically moveable section including said horizontal planar screen, said first optical system and said digital camera; and
    a computer provided with a display screen located exterior to said imager housing and in communication with said digital camera for processing the plurality of images provided by said digital camera;
    wherein said vertically moveable section is raised or lowered to various heights with respect to the figure to allow various horizontal sections of the figure to be projected onto said horizontal planar screen, a picture of each of said horizontal sections transmitted to said computer from said digital camera to produce a rendering of the figure on said display screen.

2. The system in accordance with claim 1, wherein said first optical system is provided with a plurality of horizontally spaced optical elements used to project each horizontal section onto said horizontal planar screen.

3. The system in accordance with claim 2, further including a light source unattached to said imager housing assembly for illuminating the figure.

4. The system in accordance with claim 3, wherein said light source includes a plurality of fluorescent lights provided between said imager housing assembly and the figure.

5. The system in accordance with claim 2, wherein the figure is covered with light and absorbing material and a series of strips of light scattering material provided at discrete heights, one strip of light scattering material for each of said horizontal sections of the figure.

6. The system in accordance with claim 2 wherein each of said optical elements comprises a focusing lens attached to an Amici prism.

7. The system in accordance with claim 2 further including a second optical system for creating a plane of light directed at the figure, said second optical system attached to said vertically moveable section.

8. The system in accordance with claim 7 wherein said second optical system includes a plurality of lasers, each of said lasers associated with a separate cylinder lens.

9. The system in accordance with claim 2 wherein said figure is covered by a garment including light absorbent material and provided with a series of strips of light scattering material provided at discrete heights, one strip of light scattering material for each of said horizontal sections of the figure.

10. The system in accordance with claim 1 further including a device for automatically moving said imager housing assembly to specific heights for allowing the various horizontal sections of the figure to be sequentially projected onto said horizontal planar screen.

11. The system in accordance with claim 1, wherein the three dimensional figure is a human and further including software provided in said computer for manipulating the rendering of the figure to form a plurality of poly lines and to properly scale the rendering to produce a pattern for a particular garment precisely sized to the individual.

12. The system in accordance with claim 11, further including a plotter connected to said computer for printing the pattern.

13. A system for obtaining a rendering of a three dimensional figure comprising:
    an imager housing assembly provided with an enclosed moveable section including a bottom planar horizontal surface;
    a planar screen provided within said imager housing assembly;
    a first optical system attached to the exterior of said enclosed moveable section, said optical system receiving light reflected from the figure and further directing the light onto said planar screen;

a digital camera provided within said enclosed moveable section directed at said planar screen, for creating a plurality of images of the information provided on said horizontal screen;

a device for changing the position of moveable sections including said planar screen, said first optical system and said digital camera with respect to the figure; and a computer provided with a display screen located exterior to said imager housing and in communication with said digital camera for processing the plurality of images provided by said digital camera;

wherein said moveable section is with respect to the figure to allow various horizontal sections of the figure to be projected onto said planar screen, a picture of each of said horizontal sections transmitted to said computer from said digital camera to produce a rendering of the figure on said display screen.

14. The system in accordance with claim 13, wherein said first optical system is provided with a plurality of horizontally spaced optical elements used to project each horizontal section onto said planar screen.

15. The system in accordance with claim 14, further including a light source unattached to said imager housing assembly for illuminating the figure.

16. The system in accordance with claim 15, wherein said light source includes a plurality of fluorescent lights provided between said imager housing assembly and the figure.

17. The system in accordance with claim 14, wherein the figure is covered with light absorbent material and a series of strips of light scattering material provided at discrete heights, one strip of light scattering material for each of said horizontal sections of the figure.

18. The system in accordance with claim 14 wherein each of said optical elements comprises a focusing lens attached to an Amici prism.

19. The system in accordance with claim 14 further including a second optical system for creating a plane of light directed at the figure, said second optical system attached to said moveable section.

20. The system in accordance with claim 19 wherein said second optical system includes a plurality of lasers, each of said lasers associated with a separate cylinder lens.

21. The system in accordance with claim 14 wherein said figure is covered by a garment including light absorbent material and provided with a series of strips of light scattering material provided at discrete heights, one strip of light scattering material for each of said horizontal sections of the figure.

22. The system in accordance with claim 13 further including a device for automatically moving said imager housing assembly to specific positions for allowing the various horizontal sections of the figure to be sequentially projected onto said planar screen.

23. The system in accordance with claim 13, wherein the three dimensional figure is a human and further including software provided in said computer for manipulating the rendering of the figure to form a plurality of poly lines and to properly scale the rendering to produce a pattern for a particular garment precisely sized to the individual.

24. The system in accordance with claim 23, further including a plotter connected to said computer for printing the pattern.

25. A method of producing a rendering of a three dimensional figure, comprising:

posing the figure in front of an imager housing assembly provided with a horizontal planar screen, an optical system and a digital camera;

illuminating the figure from a light source;

raising or lowering said imager housing assembly, said horizontal planar screen, said optical system and said digital camera to a plurality of heights with respect to the figure;

projecting a horizontal section of the figure onto said horizontal planar screen for each of said plurality of heights;

taking a digital photograph of each of said horizontal sections projected onto said horizontal planar screen;

communicating each of said digital photographs to a computer provided with a display screen; and providing a rendering of the three dimensional figure on said display screen.

26. The method in accordance with claim 25, wherein said illuminating step illuminates the figure with a plane of laser light.

27. The method in accordance with claim 26, wherein said raising or lowering step, automatically raises or lowers said image housing assembly to each of said plurality of heights.

28. The method in accordance with claim 25, wherein said raising or lowering step, automatically raises or lowers said image housing assembly to each of said plurality of heights.

29. The method in accordance with claim 25, further including the steps of:

manipulating said rendering to form a plurality of poly lines on said rendering; and scaling said rendering to produce a pattern used to produce a model for ornamental use.

30. A method of producing a rendering of a three dimensional figure, comprising:

posing the figure in front of an imager housing assembly provided with a planar screen, an optical system and a digital camera;

illuminating the figure from a light source;

changing the position of said imager housing assembly, said planar screen, said optical system and said digital camera to a plurality of positions with respect to the figure;

projecting a horizontal section of the figure onto said planar screen for each of said plurality of positions;

taking a digital photograph of each of said horizontal sections projected onto said planar screen;

communicating each of said digital photographs to a computer provided with a display screen; and providing a rendering of the three dimensional figure on said display screen.

31. The method in accordance with claim 30, wherein said illuminating step illuminates the figure with a plane of laser light.

32. The method in accordance with claim 31, wherein said image housing assembly is automatically raised to each of said positions.

33. The method in accordance with claim 30, wherein said image housing assembly is automatically raised to each of said positions.

34. A method of producing a clothing pattern for a human, comprising:

posing the human in front of an imager housing assembly provided with a horizontal planar screen, an optical system and a digital camera;

illuminating the human from a light source;

raising or lowering said imager housing assembly, said horizontal planar screen, said optical system and said digital camera to a plurality of heights with respect to the human;

projecting a horizontal section of the human onto said horizontal planar screen for each of said plurality of heights;

taking a digital photograph of each of said horizontal sections projected onto said horizontal planar screen;

communicating each of said digital photographs to a computer provided with a display screen;

providing a rendering of a portion of the human on said display screen;

manipulating said rendering to form a plurality of poly lines on said rendering;

scaling said rendering to produce a clothing pattern for the human precisely sized to the human; and printing said clothing pattern.

35. The method in accordance with claim 34, wherein said illuminating step illuminates the human with a plane of laser light.

36. The method in accordance with claim 35, wherein said raising or lowering step automatically raises or lowers said imager housing assembly to each of said plurality of heights.

37. The method in accordance with claim 34, wherein said raising or lowering step automatically raises or lowers said imager housing assembly to each of said plurality of heights.

* * * * *